C. A. PETERS.
AGRICULTURAL IMPLEMENT.
APPLICATION FILED OCT. 6, 1919.
Reissued Jan. 18, 1921.
15,029.
3 SHEETS—SHEET 1.
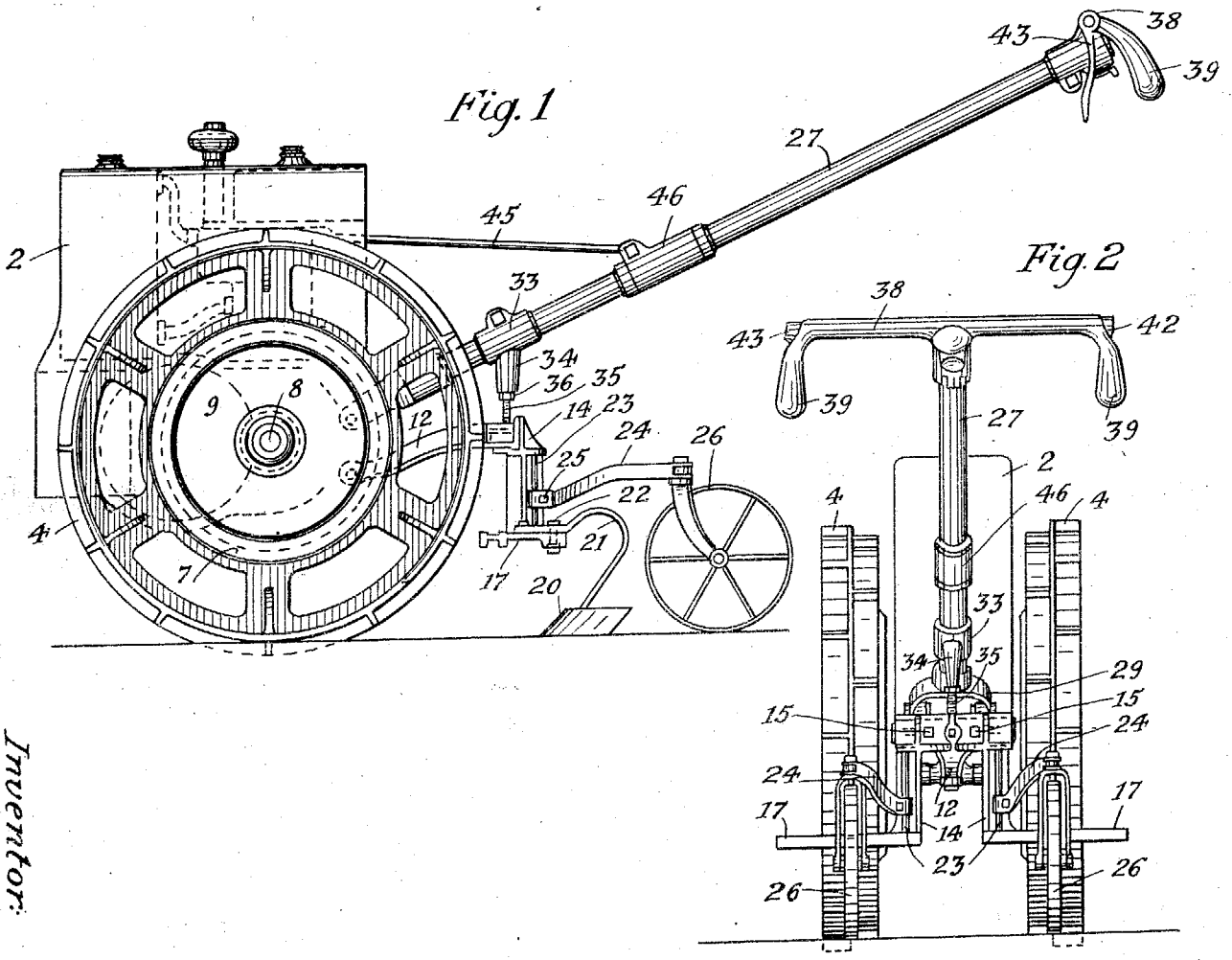
*Inventor:*
*Cornelius A. Peters.*
*By* Paul Paul
*his Attorneys.*

C. A. PETERS.
AGRICULTURAL IMPLEMENT.
APPLICATION FILED OCT. 6, 1919.
Reissued Jan. 18, 1921.
15,029.
3 SHEETS—SHEET 2.
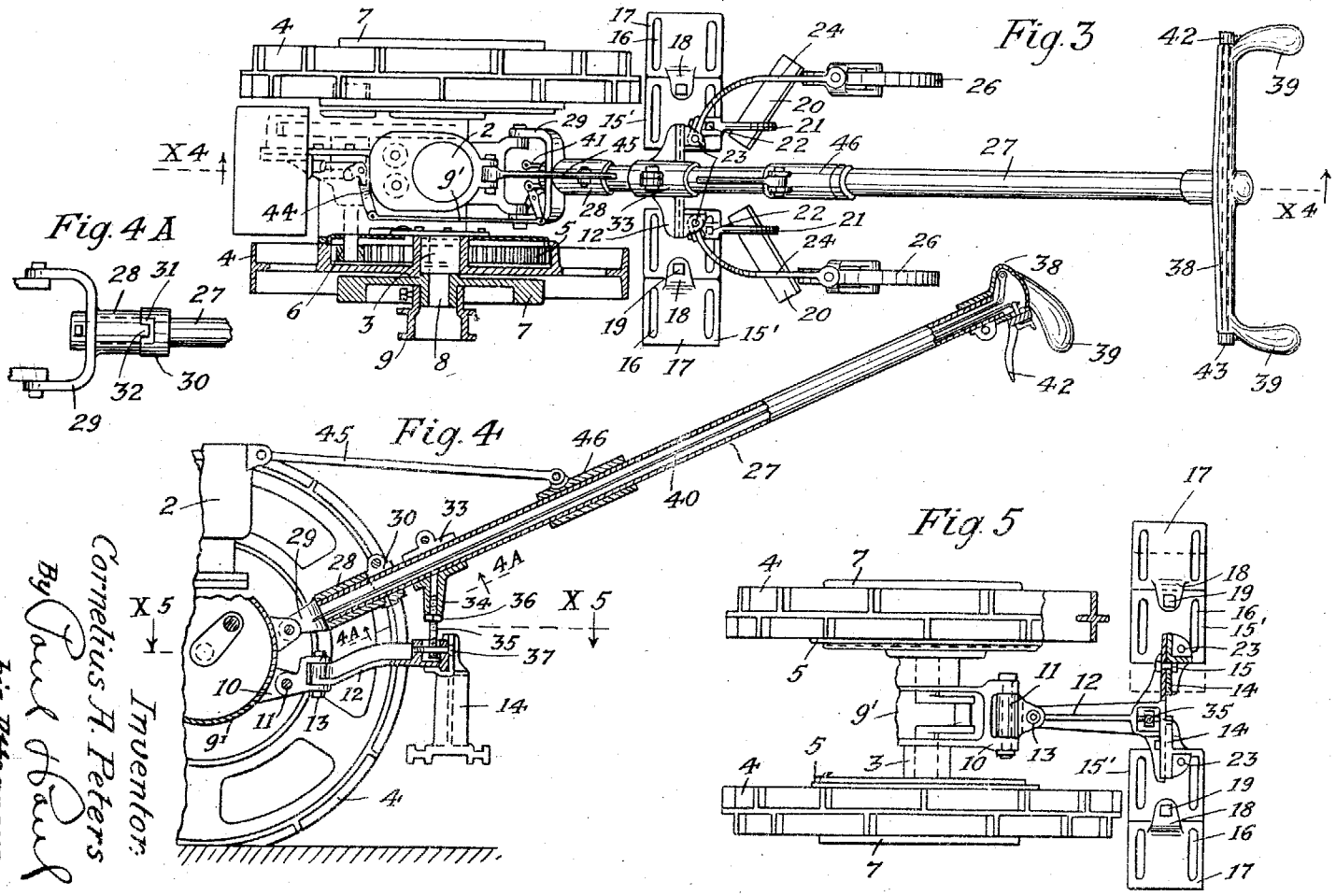
Inventor:
Cornelius A. Peters
By Paul Paul
his Attorneys.

C. A. PETERS.
AGRICULTURAL IMPLEMENT.
APPLICATION FILED OCT. 6, 1919.
Reissued Jan. 18, 1921.
15,029.
3 SHEETS—SHEET 3.
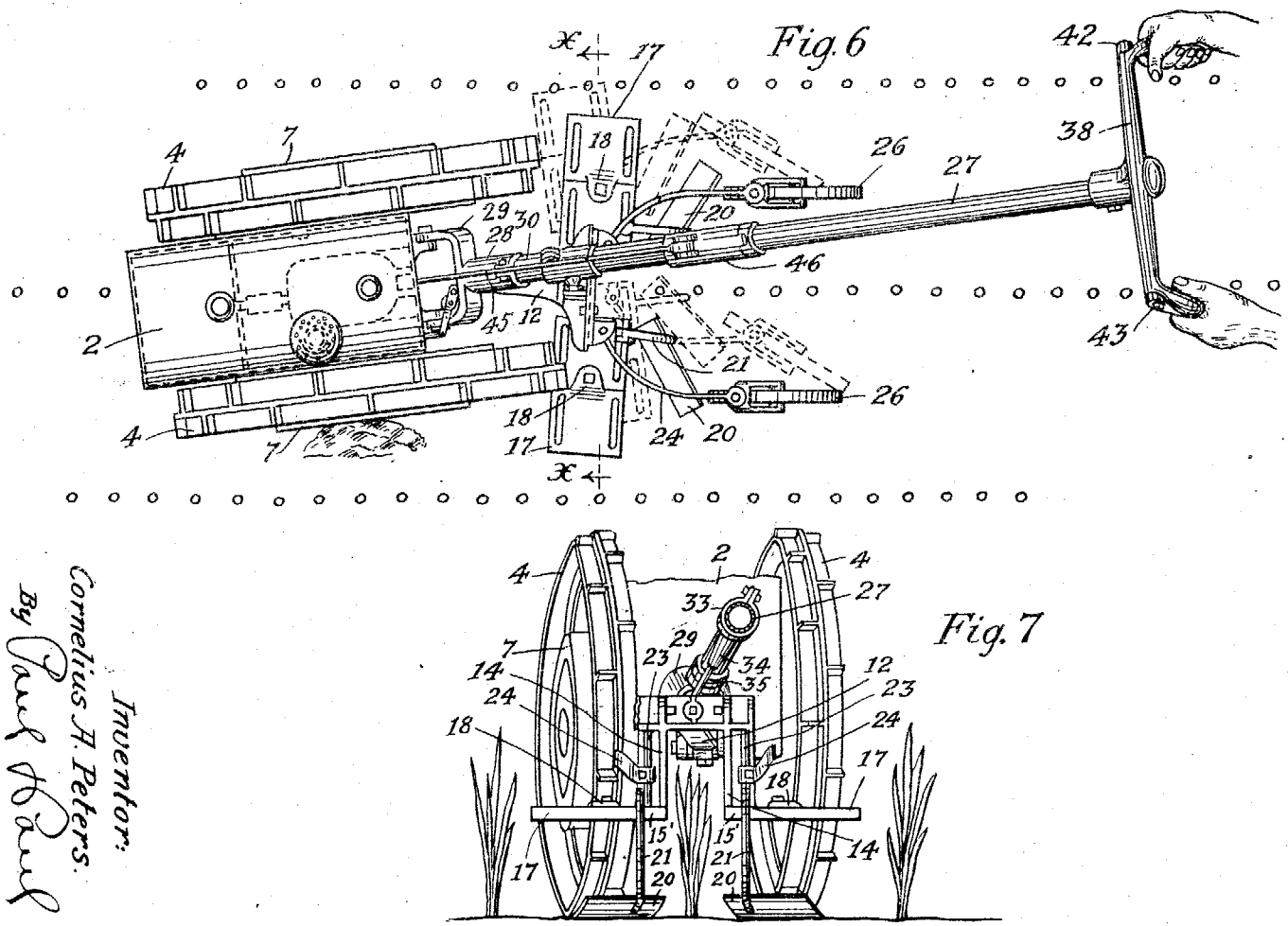
Inventor:
Cornelius A. Peters.
By Paul & Paul
his Attorneys.

UNITED STATES PATENT OFFICE.

CORNELIUS A. PETERS, OF MINNEAPOLIS, MINNESOTA, ASSIGNOR, BY MESNE ASSIGNMENTS, TO BEEMAN TRACTOR COMPANY, OF MINNEAPOLIS, MINNESOTA, A CORPORATION OF MINNESOTA.

AGRICULTURAL IMPLEMENT.

15,029. Specification of Reissued Letters Patent. Reissued Jan. 18, 1921.

Original No. 1,245,121, dated October 30, 1917, Serial No. 49,139, filed September 7, 1915. Application for reissue filed October 6, 1919. Serial No. 328,891.

*To all whom it may concern:*

Be it known that I, CORNELIUS A. PETERS, a citizen of the United States, resident of Minneapolis, county of Hennepin, State of Minnesota, have invented certain new and useful Improvements in Agricultural Implements, of which the following is a specification.

The object of my invention is to improve and perfect the apparatus shown and described in the application of Rex Parker Hicks, traction machines, filed January 8, 1915, Serial No. 1136.

A further object is to provide a means for controlling the plows or cultivators which will prevent them from jumping laterally and causing damage to the plants being cultivated in case the machine should strike an obstruction.

A further object is to provide improved means for guiding the cultivators independently of the movement of the engine, which will allow them to be moved or swayed from side to side for cultivating the soil near the plants or at a distance therefrom, as may be desired.

A further object is to provide a mounting for the cultivators which will permit of lateral adjustment thereof, according to the space between the rows and for controlling the depth of cultivation.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation of an agricultural implement embodying my invention, Fig. 2 is a rear elevation of the same, Fig. 3 is a plan view, partially in section, illustrating the driving mechanism, Fig. 4 is a sectional view on the line $x^4$ of Fig. 3, Fig. $4^a$ is a detail view, showing the connection between the steering post and the fork or clevis of the machine frame, Fig. 5 is a sectional view on the line $x^5$ of Fig. 4, Fig. 6 is a plan view illustrating in dotted lines the position the cultivators would assume in case the machine should come in contact with an obstruction, the full lines indicating how the operator may rock the post to hold the plows in their proper position between the rows of plants, Fig. 7 is a sectional view on the line $x—x$ of Fig. 6, illustrating the tilted or rocked position of the steering post.

In the drawing, 2 represents a gas engine having extensions 3 of the crank case whereon the carrying wheels 4 are mounted, preferably concentric with the crank shaft, as shown in the Hicks application, above referred to. The carrying wheels have an internal gear 5 meshing with driving pinions 6 which are geared to the crank shaft in a suitable manner, preferably as shown in the Hicks application, and to which I make no claim herein. Fly wheels 7 are mounted on the ends of the crank shaft 8 and one of said wheels is provided with a pulley 9 for the application of a belt, all substantially as shown in the Hicks application.

The crank case 9′ is provided with ears 10 in which a yoke 11 is pivoted. A draft bar 12 has a vertical pivot 13 in said yoke and extends rearwardly therefrom and is provided with hangers 14 secured to said draft bar by suitable means, such as bolts 15. At the lower ends of these hangers laterally extending horizontal plates 15′ are provided, having grooves 16 therein arranged in parallel relation at the front and rear of the plates and at the outer ends of the plates extensions 17 are provided, secured to the plates 15′ by suitable means, such as ears 18 and bolts 19. These plates 17 are provided with grooves similar to those of the plates 15′ and allow a considerable range of lateral adjustment of the cultivators. 20 represents the cultivators, of any suitable form, having upwardly curved shanks 21 secured at 22 in the grooves 16 and movable back and forth therein to regulate the distance between the cultivators, according to the character of the plants to be cultivated, and the distance between the rows. The outer pair of plates 17 may also be used for another set of cultivators mounted in substantially the same way as the cultivators 20. The hangers 14 are also provided with upright rods 23 whereon the forward ends of arms 24 are vertically adjustable by means of clamps 25, the rear ends of said arms having bearings for caster wheels 26 which travel in the rear of the cultivators and serve to regulate their depth of cut. By loosening the clamps 25 the arms can be raised or lowered, as occasion may require. By providing the double row of grooves in the supporting plates I may move the cultivators forward or backward, near the wheels or farther therefrom, as may be best suited for the soil and the character of the plants being cultivated.

I have found it desirable in a machine of this type to provide a means for steering the machine and controlling the cultivators, which will allow the operator to throw the cultivators to the right or left, out of contact with the plants in case the machine itself should be thrown laterally by contact with a stone, root, or other obstruction, or should the operator desire to cultivate in one row nearer the plants than in the other row. In other words, the connection allows the operator to swing the cultivators to the left or to the right, as may be desired, and have perfect control over them independently of the traction portion of the machine.

With this end in view, I provide a single steering post 27, preferably tubular in form, having one end fitting within a socket 28 of a yoke 29 that is pivotally mounted on the crank case. A collar 30 is mounted on the post and has a notch 31 therein to receive a lug 32 on the wall of the socket, said lug allowing the post to be rocked to the right or the left for a limited distance. The collar 33 is clamped on the post and has a socket 34 therein to receive the threaded end of a bolt 35 that is adjustable in said socket and is provided with a lock nut 36. The lower end of this bolt has a pivotal connection with a horizontal pin 37 that is mounted in the rear end of the draft bar 12 in position to allow the said draft bar to swing laterally on its vertical pivot 13 and thereby throw the cultivators either to the right or to the left, according to the direction in which the steering post is rocked. A cross bar 38 is mounted on the end of the steering post and provided with hand grips 39 and wires 40 and 41 are connected with levers 42 and 43 and extend through the hollow post to the clutch control 44 and to the throttle valve, not shown. The tilting of the machine and the depression of the plows is facilitated by the pivotal connection of the rod 45 between a sleeve 46 on the steering post and the upper portion of the engine.

In the operation of the machine, the cultivators having been properly mounted in the drag-bar with respect to the distance between the rows of plants, the motor is started and the operator, grasping the handle bars, can guide the machine by swinging the steering post from side to side and thereby turn the machine on its supporting wheels. He can also shift the cultivators transversely with respect to the path of the machine and independently of the guiding of the machine by rocking the steering post on its longitudinal axis through the bearing at 31—32 and through the pivotal connections 35—36 between the steering post and the cultivator drag-bar. If, therefore, the machine should strike an obstruction and jump to one side or should be diverted from the proper direction by an inequality in the ground, the operator may still maintain the cultivators in their proper position with respect to the plants, independently of the movement or position of the machine itself. He can also cultivate close up to one row of plants, if desired, and at a considerable distance from the other row, and by bearing down on the handle bars or lifting them, regulate the depth of cultivation. The operator thus has perfect control of the cultivators at all times during the operation of the machine. I have found in the actual operation of the machine that when the ground-working implements are pressed down into the soil, except in very loose soil, the resistance to the lateral movement of the implements is sufficient to hold them against deviation from a straight line and the machine itself can be oscillated on a vertical axis by movement of the steering post to one side or the other and the direction of the machine changed without changing the position of the implements in the soil. When the machine is not in use, shifting of the steering post horizontally to one side or the other to steer the machine will have the effect of moving the ground-working implements laterally also, but when these implements are thrust into the soil to their working position, the post will swing on its pivotal connection with the draft bar of the implements in steering the machine without affecting the implements themselves. This is a valuable feature of the machine which did not become apparent until it was put to a practical test in the soil, when it was found that the machine could be guided while straddling a row without affecting the position of the implements in the soil, and it was possible to run the cultivators or other implements close to the rows of plants and while doing so, change the direction of travel of the machine without danger of injury to the plants.

It is not necessary to lift the implements out of the soil when it is desired to swerve the machine to one side or the other, but by bearing down on the steering device and holding the implements in the soil, the machine can be guided while the cultivators or other implements are working close to the plants, with the machine straddling the row, without any danger of damage to the plants, the operator having quick and accurate control of the machine.

I do not wish to be confined to the particular means employed for mounting the cultivators or to the details of the steering device, as in various ways these features may be modified and still be within the scope of my invention.

I claim as my invention:

1. A machine of the class described having wheels in combination with ground-working implements connected with said machine for movement in an upright position, transversely of the path of the machine, and a steering device mounted to swing said machine on its supporting wheels to guide it between the rows of plants, said steering device being also mounted to move said ground-working implements transversely of the path of the machine, independently of the guiding thereof.

2. A machine of the class described having wheels and a suitable frame in combination with ground-working implements pivotally connected with said frame in the rear of the axis of said wheels and adjacent thereto for movement transversely of the path of said wheels, a steering device having a pivotal connection with said frame above and adjacent to the connection of said ground-working implements therewith and means connecting said steering device with said ground-working implements, said device being mounted to swing said frame laterally on its supporting wheels for guiding it between the rows of plants, and said steering device also having a rotary movement on its longitudinal axis for shifting said ground-working implements laterally from side to side, independently of the guiding movement of said steering device.

3. A machine of the class described comprising a frame having carrying wheels, a steering post having a pivotal connection with said frame in the rear of the axis of said wheels and adjacent thereto, a draft bar connected with said frame beneath and adjacent to the pivot of said steering post thereon and having a lateral oscillating movement, and means connecting said steering post with said draft bar, ground-working implements connected with said draft bar, said implements being shifted from side to side by the rocking of said steering post.

4. A machine of the class described having carrying wheels, a steering post connected with said frame and mounted to rock thereon, a draft bar connected with said frame, hangers carried by said bar, cultivators mounted for lateral adjustment on said hangers and means pivotally connecting said draft bar and hangers with said steering post for moving said hangers and cultivators laterally when said post is rocked.

5. A machine of the class described having carrying wheels, a steering device mounted to rock on said frame, a draft bar connected with said frame, hangers carried by said draft bar, ground-working implements mounted in said hangers, means having arms mounted for vertical adjustment on said hangers to regulate the depth of cut of said ground-working implements, and means connecting said steering device with said hangers for imparting a lateral movement thereto when said steering device is rocked.

6. A machine of the class described having carrying wheels in combination with cultivators pivotally connected therewith and a steering device having a pivotal connection with said machine for moving said cultivators vertically to increase or decrease the depth of cut thereof, lateral movement of said steering device swinging said machine on its supporting wheels to guide it between the rows of plants, said steering device also having a rotary movement on its longitudinal axis for moving said cultivators laterally with respect to said machine and independently of the guiding thereof.

7. The combination, with a wheel-supported frame, of a rearwardly extending steering member centrally mounted on said frame for transmitting lateral movement of said member to guide said frame, said member having an independent rocking movement on its longitudinal axis, cultivators connected with said frame beneath and adjacent to the mounting of said steering member thereon, and mechanism actuated through the rocking of said steering member on its longitudinal axis for moving said cultivators laterally, whereby the operator walking in the rear of the machine can guide it through the lateral movement of said steering member and through the rocking of said steering member on its longitudinal axis can shift the cultivators laterally in either direction, independently of said frame.

8. The combination, with a wheel-supported frame, of a steering member having a horizontal pivot on said frame and movable vertically on said pivot, and also mounted to rock on its longitudinal axis, ground-working implements connected with said frame, means connecting said ground-working implements with said steering member for transmitting the vertical movement of said steering member on its pivot to increase or decrease the depth of cut of said ground-working implements, lateral oscillation of said steering member swinging said frame to guide the machine, the rocking of said steering member on its longitudinal axis shifting said ground-working implements laterally, independently of the movement of said frame.

9. The combination, with a wheel-supported frame, of a rearwardly extending steering member mounted for lateral oscillation with said frame to steer the same and for vertical movement independently of said frame, said steering member also having a rotary movement on its longitudinal axis, a draft bar pivotally connected to said frame for lateral oscillation independently thereof, ground-working implements mounted in said draft bar, means connecting said draft bar with said steering member for transmitting vertical movement of said steering member to said bar and implements to increase or decrease the cut of said implements, said means also shifting said implements laterally through the rotary movement of said steering member independently of the machine-guiding lateral oscillation of said member.

10. A machine of the class described having wheels and a frame therefor, in combination with ground-working implements connected with said frame, a steering device connected with said frame and having a pivotal connection with said ground-working implements, said steering device being mounted to swing said frame on a vertical axis for steering it between the rows of plants, said ground-working implements when at work being held by the soil against lateral movement during the swinging of said frame, whereby said steering device may be oscillated laterally to guide the machine independently of lateral movement of said ground-working implements.

11. A machine of the class described comprising a frame and wheels therefor mounted to straddle a row of plants, a steering device connected with said frame, ground-working implements connected with said frame, means connecting said steering device with said ground-working implements, the laterally swinging movement of said steering device rocking said wheels on a vertical axis to guide the machine, said implements being held by pressure of the soil from following the movement of said steering device, whereby said implements may be operated close to the plants on both sides of a row and the machine guided independently thereof.

12. A machine of the class described having a traveling supporting means, ground working implements supported for movement in an upright position transversely of the machine, and a steering device connected with the traveling supporting means and the ground working implements to guide laterally the traveling supporting means independently of the working implements and move the working implements transversely of the path of the traveling supporting means, independently of the latter.

13. In combination with a portable machine frame and ground working implements connected one with the other by means permitting lateral movement of each independently of the other, of a steering device connected with both the machine frame and ground working implements, one connection permitting lateral movement of the machine frame independent of the ground working implements and the other permitting lateral movement of the ground working implements independent of the machine frame.

14. In combination with a portable machine frame and ground working implements connected one with the other by means permitting lateral movement of each independently of the other, of a rotatable steering device connected with both the machine frame and ground working implements, the connection with the machine frame permitting vertical movement of the steering device to raise and lower the ground working implements and lateral movement of the machine frame independent of the ground working implements and the connection with the ground working implements permitting the steering device to move said implements laterally independent of the machine frame.

15. The combination with a portable frame, a draft bar connected therewith to permit lateral movement of the frame and bar, each independently of the other and also vertical movement of the draft bar, ground working implements carried by the draft bar, and a rotatable steering device connected with the machine frame and draft bar, the connection with the machine frame permitting vertical movement of the steering device to raise and lower the ground working implements and side movement for lateral movement of the frame independent of the ground working implements, and the connection with the draft bar permitting lateral movement of said bar and ground working implements independent of the machine frame.

16. The combination with a traveling frame and ground working implements connected with the frame to permit the frame to have a lateral movement independent of the implements, of a steering device connected with the ground working implements and said frame, the connection of the steering device to the frame and implements adapting the steering device to transmit lateral guiding movement to the frame independently of the ground working implements.

In witness whereof, I have hereunto set my hand this first day of October, 1919.

CORNELIUS A. PETERS.

Witnesses:
GENEVIEVE E. SORENSEN,
MARGARET DELEGLESE.